United States Patent
Galford et al.

(10) Patent No.: US 9,989,667 B2
(45) Date of Patent: Jun. 5, 2018

(54) PORE SIZE CLASSIFICATION IN SUBTERRANEAN FORMATIONS BASED ON NUCLEAR MAGNETIC RESONANCE (NMR) RELAXATION DISTRIBUTIONS

(71) Applicant: Halliburton Energy Services, Inc., Houston, TX (US)

(72) Inventors: James E. Galford, Missouri City, TX (US); Ronnel C. Balliet, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 666 days.

(21) Appl. No.: 14/414,564

(22) PCT Filed: Dec. 19, 2013

(86) PCT No.: PCT/US2013/076679
§ 371 (c)(1),
(2) Date: Jan. 13, 2015

(87) PCT Pub. No.: WO2015/094307
PCT Pub. Date: Jun. 25, 2015

(65) Prior Publication Data
US 2016/0274266 A1 Sep. 22, 2016

(51) Int. Cl.
*G01V 3/32* (2006.01)
*G01V 3/34* (2006.01)
*G01V 3/38* (2006.01)

(52) U.S. Cl.
CPC . *G01V 3/38* (2013.01); *G01V 3/32* (2013.01)

(58) Field of Classification Search
CPC ... G01V 3/32; G01V 3/14; G01V 3/38; G01N 24/081; G01R 33/448; G01R 33/50; E21B 47/00; G06F 19/00
See application file for complete search history.

(56) References Cited

U.S. PATENT DOCUMENTS

| | | |
|---|---|---|
| 5,289,124 A | 2/1994 | Jerosch-Herold et al. |
| 5,497,087 A | 3/1996 | Vinegar et al. |
| (Continued) | | |

FOREIGN PATENT DOCUMENTS

| | | |
|---|---|---|
| WO | WO 2012/103397 | 8/2012 |
| WO | WO2013/066953 | 5/2013 |
| WO | WO2013/112515 | 8/2013 |

OTHER PUBLICATIONS

International Search Report and Written Opinion of the International Searching Authority issued in International Application No. PCT/US2013/076679 dated Sep. 3, 2014; 15 pages.
(Continued)

*Primary Examiner* — Huan Tran
(74) *Attorney, Agent, or Firm* — Benjamin Fite; Parker Justiss, P.C.

(57) ABSTRACT

Porosity of a subterranean region is estimated by accessing a nuclear magnetic resonance (NMR) relaxation distribution corresponding to NMR measurements of a subterranean region in which the NMR relaxation distribution includes multiple of peaks, fitting Gaussian functions to the NMR relaxation distribution to establish values for fitting parameters for each of the Gaussian functions, determining the porosity of the subterranean region based on the values of the fitting parameters of the Gaussian functions, and categorizing the porosity based on a relationship between the fitting parameters of the Gaussian functions and a distribution of pore sizes.

21 Claims, 10 Drawing Sheets

(56) References Cited

U.S. PATENT DOCUMENTS

| | | | |
|---|---|---|---|
| 5,696,448 | A | 12/1997 | Coates et al. |
| 6,097,184 | A | 8/2000 | Flaum |
| 6,140,817 | A | 10/2000 | Flaum et al. |
| 6,268,726 | B1 | 7/2001 | Prammer et al. |
| 6,331,775 | B1 | 12/2001 | Thern et al. |
| 6,369,567 | B1 | 4/2002 | Song et al. |
| 6,462,542 | B1 | 10/2002 | Venkataramanan et al. |
| 6,646,437 | B1 | 11/2003 | Chitale et al. |
| 6,686,736 | B2 | 2/2004 | Schoen et al. |
| 6,690,166 | B2 | 2/2004 | Ni et al. |
| 6,808,028 | B2 | 10/2004 | Woodburn et al. |
| 6,833,699 | B2 | 12/2004 | Galford et al. |
| 6,954,066 | B2 | 10/2005 | Siess et al. |
| 7,176,682 | B2 | 2/2007 | Galford et al. |
| 7,221,158 | B1 | 5/2007 | Ramakrishnan |
| 7,299,132 | B2 | 11/2007 | Sayers et al. |
| 7,363,161 | B2 | 4/2008 | Georgi et al. |
| 7,463,027 | B2 | 12/2008 | Prammer et al. |
| 7,495,436 | B2 | 2/2009 | Hamadan et al. |
| 7,500,388 | B2 | 3/2009 | Fujisawa et al. |
| 7,538,547 | B2 | 5/2009 | Heaton |
| 7,804,297 | B2 | 9/2010 | Romero |
| 8,005,619 | B2 | 8/2011 | Akbar |
| 8,274,399 | B2 | 9/2012 | Strachan et al. |
| 8,311,788 | B2 | 11/2012 | Hurley et al. |
| 8,427,145 | B2 | 4/2013 | Mitchell et al. |
| 8,452,539 | B2 | 5/2013 | Chugunov et al. |
| 8,452,838 | B2 | 5/2013 | Ono et al. |
| 2003/0011489 | A1 | 1/2003 | Viswanathan |
| 2004/0032257 | A1 | 2/2004 | Freedman |
| 2006/0055403 | A1 | 3/2006 | Freedman |
| 2006/0272812 | A1 | 12/2006 | Yu et al. |
| 2007/0011115 | A1 | 1/2007 | Smith, Jr. et al. |
| 2007/0246649 | A1 | 10/2007 | Jacobi et al. |
| 2008/0183390 | A1 | 7/2008 | Hamdan et al. |
| 2009/0182693 | A1 | 7/2009 | Fulton et al. |
| 2010/0057364 | A1 | 3/2010 | Clavand |
| 2010/0264914 | A1 | 10/2010 | Minh |
| 2010/0315081 | A1 | 12/2010 | Chanpura et al. |
| 2011/0144913 | A1 | 6/2011 | Klein et al. |
| 2011/0218735 | A1 | 9/2011 | Han et al. |
| 2012/0035851 | A1 | 2/2012 | Romero |
| 2012/0065888 | A1 | 3/2012 | Wu et al. |
| 2012/0221306 | A1 | 8/2012 | Hurley et al. |
| 2013/0164381 | A1 | 6/2013 | Dixon et al. |
| 2013/0261979 | A1 | 10/2013 | Al-Muthana et al. |
| 2013/0261973 | A1 | 12/2013 | Li |
| 2014/0253116 | A1* | 9/2014 | Freedman ............... G01R 33/30 324/303 |
| 2015/0215250 | A1* | 7/2015 | Dinka .................... H04L 67/10 709/206 |

OTHER PUBLICATIONS

Authorized Officer Kim, Jin Ho in International Search Report and Written Opinion in International Application No. PCT/US2013/076674, dated Sep. 17, 2014, 11 pages.

Freedman et al., "Combining NMR and Density Logs for Petrophysical Analysis in Bas-Bearing Formations," SPWLA 39th Annual Logging Symposium, Keystone, Colorado, May 26-29, 1998, 14 pages.

Minh et al., "Sonic-Magnetic Resonance Method: A Sourceless Porosity Evaluation in Gas Bearing Reservoirs," SPE Reservoir Evaluation & Engineering, Jun. 2001, pp. 209-220.

Lan et al., "Sourceless Porosity Estimation in Gas Reservoirs Using Integrated Acoustic and NMR logs," paper SPE 133487 presented at SPE Annual Technical Conference and Exhibition, Florence, Italy, Sep. 19-22, 2010, 15 pages.

Wen et al., "Comparison and Limitaion Analysis of Approaches for Porosity Evaluation from NMR and Three Porosity Logs in Low Permeability Gas Sands with Bad Hole," paper SPE 141040 presented at the SPE Middle East Unconventional Gas Conference and Exhibition, Muscat, Oman, Jan. 31-Feb. 2, 2011, 8 pages.

Serry et al., "Sourceless Porosity and Permeability Estimation with NMR logs While Drilling in Carbonate Reservoir: A Case Study," paper SPE 164203 presented at the SPE Middle East Oil and Gas Show and Conference, Manama, Bahrain, Mar. 10-13, 2013, 18 pages.

Coates et al., "Applying Pulse-Echo NMR to Shaly Sand Formation Evaluation," paper presented at the SPWLA 35th Annual Logging Symposium, Tulsa, Oklahoma, Jun. 19-22, 1994, 22 pages.

Jacobi et al., "Integrated Petrophysical Evaluation of Shale Gas Reservoirs," SPE 114925, CIPC/SPE Gas Technology Symposium, Jun. 16-19, 2008, 23 pages.

Marzouk et al., "Geologic Controls on Wettability of Carbonate Reservoirs," paper SPE 29883 presented at the Middle East Oil Show, Bahrain, Mar. 11-14, 1995, 12 pages.

Marzouk et al., "New Classification of Carbonate Rocks for Reservoir Characterization," paper SPE 49475 presented at the Abu Dhabi International Petroleum Exhibition and Conference, Abu Dhabi, U.A.E., Oct. 11-14, 1998, 10 pages.

Frank et al., "Carbonate Rock Typing Using NMR Data: A Case Study From Al Shaheen Field, Offshore Qatar," paper IPTC 10889 presented at the International Petroleum Technology Conference, Doha, Qatar, Nov. 21-23, 2005, 14 pages.

Al Arfi "A New Porosity Partitioning-Based Methodology for Permeability and Texture Analysis in Abu Dhabi Carbonates," paper SPE 101176 presented at the Abu Dhabi International Petroleum Exhibition and Conference, Abu Dhabi, U.A.E., Nov. 5-8, 2006, 13 pages.

Al-Awadi et al., "Dolomite: Perspectives on Perplexing Mineral," Oilfiedl Review, Schlumberger, vol. 21, No. 3, 2009, 14 pages.

Ramamoorthy et al., "A New Workflow for Petrophysical and Textural Evaluation of Carbonate Reservoirs," Petrophysics, vol. 51, No. 1, Feb. 2010, 8 pages.

Jacob et al., "Advance Spectrometry and NMR Based Porosity Partitioning Integrated Technique in Evaluating Cretaceous Pinda Formation, Offshore Angola," paper SPE 145495 presented at the Asia Pacific Oil and Gas Conference and Exhibition, Jakarata, Indonesia, Sep. 20-22, 2011, 11 pages.

De Panfilis et al., "Characterization of porous media by NMR imaging and flow-diffraction," The European Physical Journal Applied Physics, vol. 8, No. 1, Oct 1999, 10 pages.

Yanbin et al., "Petrophysical characterization of coals by low-field nuclear magnetic resonance (NMR)," Fuel, v 89, n 7, p. 1371-1380, Jul. 2010 10 pages.

Halliburton, Magnetic Resonance Imagain Analysis (MRIAN™), H05695, Aug. 2007, 2 pages.

Paradigm®, "Geolog® Formation Evaluation," Reservoir Characterization, 2011, 8 pages.

Schlumberger, "Carbonate Advisor," Feb. 2008, 8 pages.

Grana et al., "Quantitative Log Interpretation and Uncertainty Propagation of Petrophysical Properties and Facies Classification from Rock-Physics Modeling and Formation Evaluation Analysis," Geophysics, Society of Exploration Geophysicists, vol. 77, No. 3, May 1, 2012, 19 pages.

Heidari et al., "Improved Estimation of Mineral and Fluid Volumetric Concentrations from Well Logs in Thinly Bedded and Invaded Formations," Geophysics, Society of Exploration Geophysicists, vol. 77, No. 3, May 1, 2012, 20 pages.

Zhang et al., "Petrophysically Constrained Inversion of Resistivity Logging Data," Petrophysics, vol. 43, No. 2, Mar. 1, 2002, <https://www.onepetro.org/download/journal-paper/SPWLA-2002-v43n2a2?id=journal-paper/SPWLA-2002-v43n2a2>, 10 pages.

* cited by examiner

PORE SIZE CLASSIFICATION IN SUBTERRANEAN FORMATIONS BASED ON NUCLEAR MAGNETIC RESONANCE (NMR) RELAXATION DISTRIBUTIONS

CLAIM OF PRIORITY

This application is a U.S. National Stage of International Application No. PCT/US2013/076679, filed Dec. 19, 2013.

BACKGROUND

This disclosure relates to analysis of nuclear magnetic resonance (NMR) relaxation distributions obtained from well logging to derive information about pore size in subterranean formations.

Nuclear magnetic resonance (NMR) logging is a type of logging (e.g., wireline logging, logging while drilling (LWD) and measurement while drilling (MWD)) that uses the NMR response of a formation to directly determine its porosity and permeability, providing a continuous record along the length of the borehole NMR logging exploits the large magnetic moment of hydrogen, which is abundant in rocks in the form of water. The NMR signal amplitude is proportional to the quantity of hydrogen nuclei present in a formation and can be calibrated to give a value for porosity. Moreover, the rate of decay of a NMR signal can be used to obtain information about the permeability of the formation.

DETAILED DESCRIPTION

The current disclosure is related to methods of analyzing nuclear magnetic resonance (NMR) relaxation distributions (e.g., $T_1$, $T_2$, etc.) in order to derive information about multiple pore size groups in a subterranean formation. Of practical interest are micro-, meso-, and macro-sized pore groups corresponding roughly to pores whose diameters are less than about 0.5 microns, between about 0.5 and about 5 microns, and greater than about 5 microns respectively. In general, the methods are applicable to NMR relaxation profiles obtained either on wireline or while drilling provided the measurements are made under conditions where a single fluid phase fills the entire formation pore volume.

The terms, micro-, meso-, and macro-sized pores convey a linguistic description of physical pore sizes and the boundaries separating the groups may not be well-defined. In other words, one may describe pores having diameters less than 0.5 microns, for example, belong to the micro porosity group while those between 0.5 and 5 microns belong to the meso porosity group. However, in a linguistic sense, the boundaries are not defined by a crisp, discrete dimensional cutoff. Thus, a pore having a diameter of 0.49 or 0.51 microns linguistically could be characterized as belonging to both the micro and meso groups. In other words, the boundaries separating the pore-size groups from a linguistic viewpoint are fuzzy.

Figure 1A:
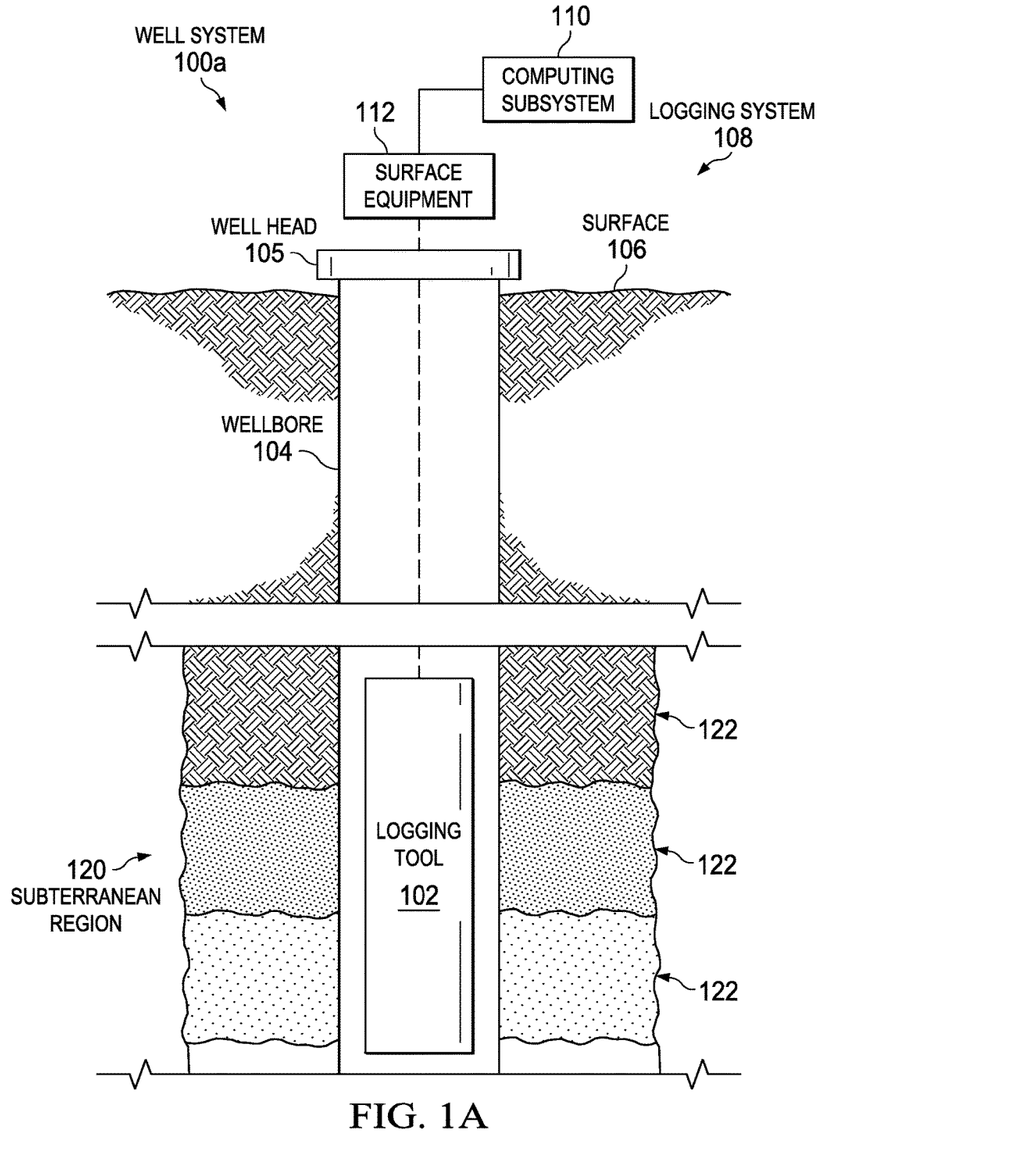
FIG. 1A is a diagram of an example well system.

FIG. 1A is a diagram of an example well system 100a. The example well system 100a includes an NMR logging system 108 and a subterranean region 120 beneath the ground surface 106. A well system can include additional or different features that are not shown in FIG. 1A. For example, the well system 100a may include additional drilling system components, wireline logging system components, etc.

The subterranean region 120 can include all or part of one or more subterranean formations or zones. The example subterranean region 120 shown in FIG. 1A includes multiple subsurface layers 122 and a wellbore 104 penetrated through the subsurface layers 122. The subsurface layers 122 can include sedimentary layers, rock layers, sand layers, or combinations of these other types of subsurface layers. One or more of the subsurface layers can contain fluids, such as brine, oil, gas, etc. Although the example wellbore 104 shown in FIG. 1A is a vertical wellbore, the NMR logging system 108 can be implemented in other wellbore orientations. For example, the NMR logging system 108 may be adapted for horizontal wellbores, slant wellbores, curved wellbores, vertical wellbores, or combinations of these.

The example NMR logging system 108 includes a logging tool 102, surface equipment 112, and a computing subsystem 110. In the example shown in FIG. 1A, the logging tool 102 is a downhole logging tool that operates while disposed in the wellbore 104. The example surface equipment 112 shown in FIG. 1A operates at or above the surface 106, for example, near the well head 105, to control the logging tool 102 and possibly other downhole equipment or other components of the well system 100. The example computing subsystem 110 can receive and analyze logging data from the logging tool 102. An NMR logging system can include additional or different features, and the features of an NMR logging system can be arranged and operated as represented in FIG. 1A or in another manner.

In some instances, all or part of the computing subsystem 110 can be implemented as a component of, or can be integrated with one or more components of, the surface equipment 112, the logging tool 102 or both. In some cases, the computing subsystem 110 can be implemented as one or more discrete computing system structures separate from the surface equipment 112 and the logging tool 102.

In some implementations, the computing subsystem 110 is embedded in the logging tool 102, and the computing subsystem 110 and the logging tool 102 can operate concurrently while disposed in the wellbore 104. For example, although the computing subsystem 110 is shown above the surface 106 in the example shown in FIG. 1A, all or part of the computing subsystem 110 may reside below the surface 106, for example, at or near the location of the logging tool 102.

The well system 100a can include communication or telemetry equipment that allow communication among the computing subsystem 110, the logging tool 102, and other components of the NMR logging system 108. For example, the components of the NMR logging system 108 can each include one or more transceivers or similar apparatus for wired or wireless data communication among the various components. For example, the NMR logging system 108 can include systems and apparatus for wireline telemetry, wired pipe telemetry, mud pulse telemetry, acoustic telemetry, electromagnetic telemetry, or a combination of these other types of telemetry. In some cases, the logging tool 102 receives commands, status signals, or other types of information from the computing subsystem 110 or another source. In some cases, the computing subsystem 110 receives logging data, status signals, or other types of information from the logging tool 102 or another source.

NMR logging operations can be performed in connection with various types of downhole operations at various stages in the lifetime of a well system. Structural attributes and components of the surface equipment 112 and logging tool 102 can be adapted for various types of NMR logging operations. For example, NMR logging may be performed during drilling operations, during wireline logging operations, or in other contexts. As such, the surface equipment 112 and the logging tool 102 may include, or may operate in connection with drilling equipment, wireline logging equipment, or other equipment for other types of operations.

Figure 1B:
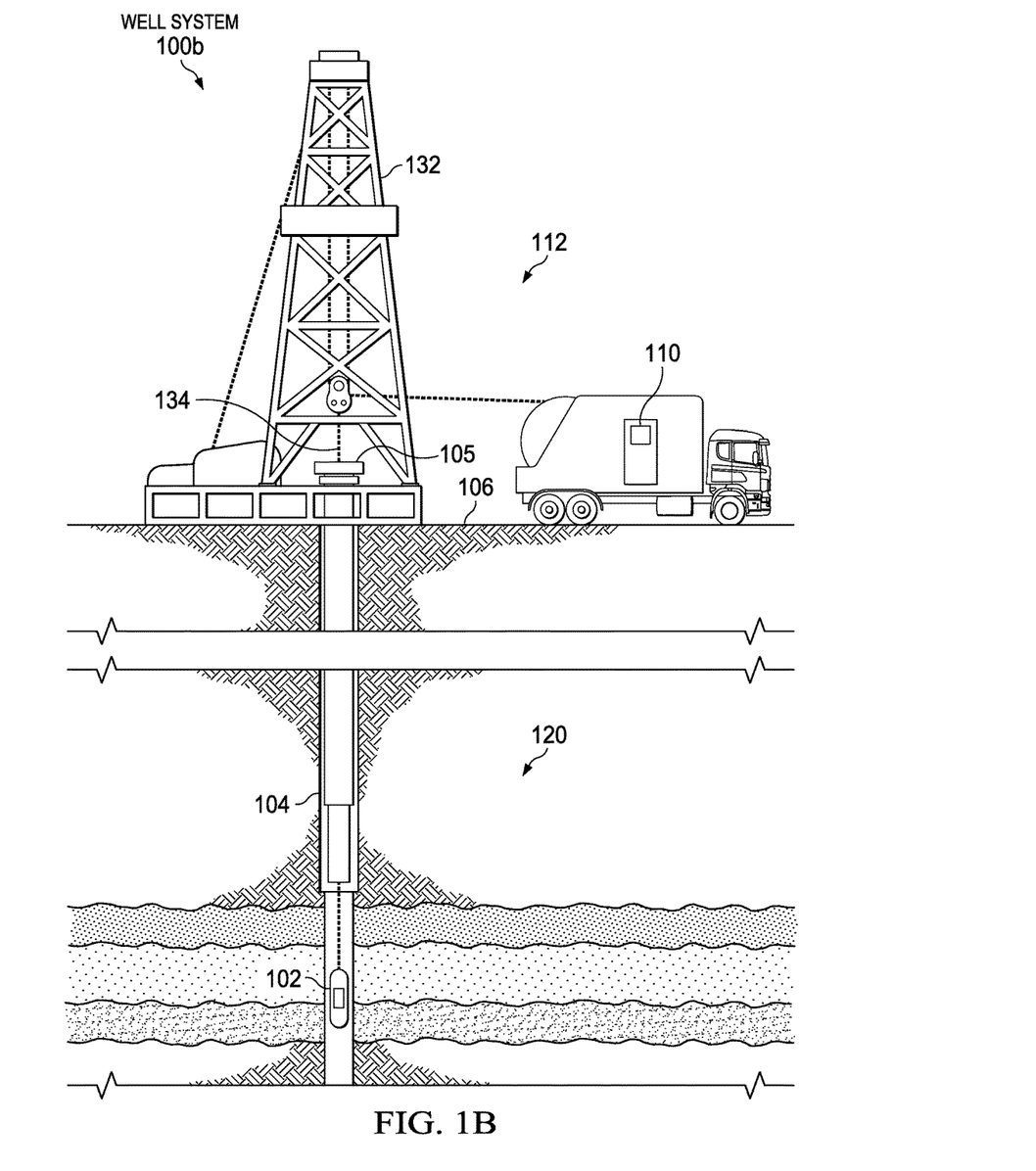
FIG. 1B is a diagram of an example well system that includes an NMR logging tool in a wireline logging environment.

In some examples, NMR logging operations are performed during wireline logging operations. FIG. 1B shows an example well system 100b that includes the NMR logging tool 102 in a wireline logging environment. In some example wireline logging operations, the surface equipment 112 includes a platform above the surface 106 is equipped with a derrick 132 that supports a wireline cable 134 that extends into the wellbore 104. Wireline logging operations can be performed, for example, after a drilling string is removed from the wellbore 104, to allow the wireline logging tool 102 to be lowered by wireline or logging cable into the wellbore 104.

Figure 1C:
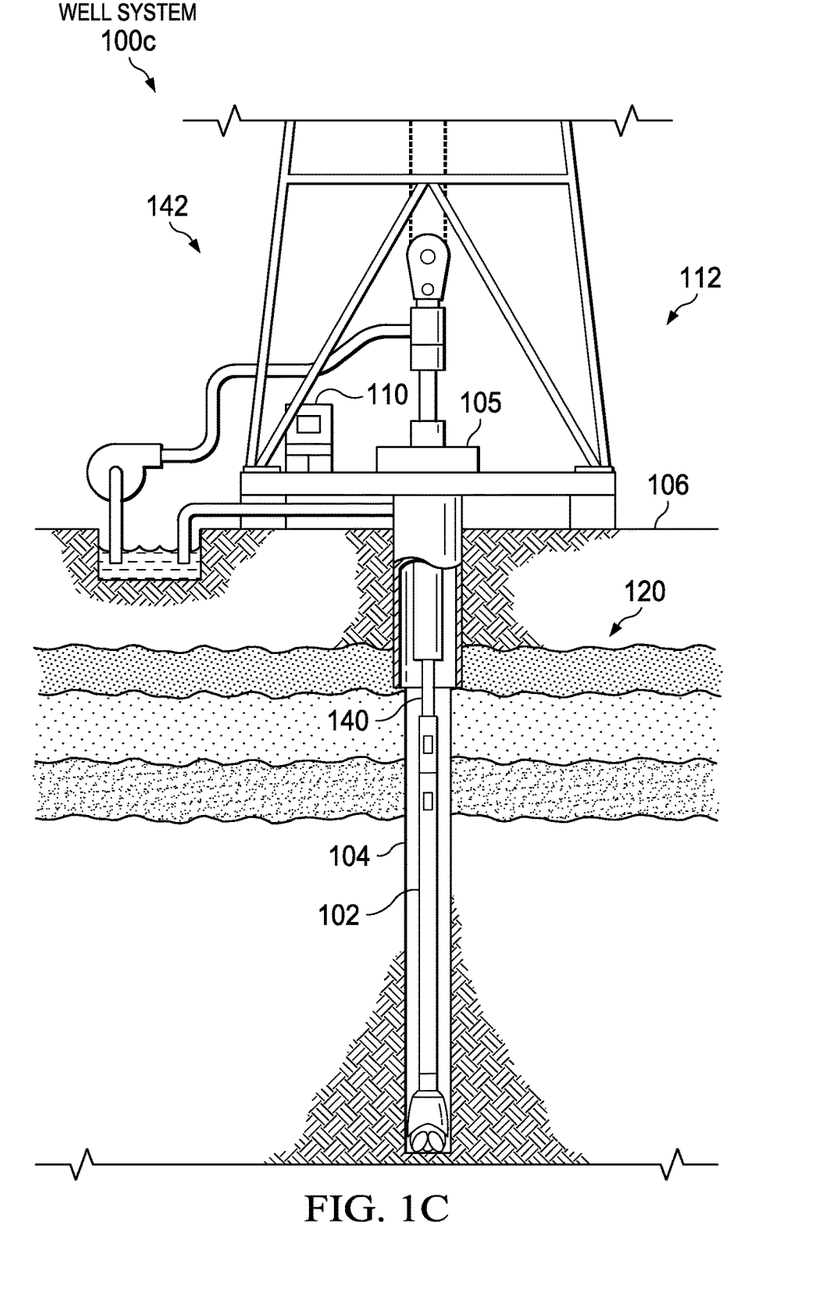
FIG. 1C is a diagram of an example well system that includes an NMR logging tool in a logging while drilling (LWD) environment.

In some examples, NMR logging operations are performed during drilling operations. FIG. 1C shows an example well system 100c that includes the NMR logging tool 102 in a logging while drilling (LWD) environment. Drilling is commonly carried out using a string of drill pipes connected together to form a drill string 140 that is lowered through a rotary table into the wellbore 104. In some cases, a drilling rig 142 at the surface 106 supports the drill string 140, as the drill string 140 is operated to drill a wellbore penetrating the subterranean region 120. The drill string 140 may include, for example, a kelly, drill pipe, a bottom hole assembly, and other components. The bottom hole assembly on the drill string may include drill collars, drill bits, the logging tool 102, and other components. The logging tools may include measuring while drilling (MWD) tools, LWD tools, and others.

In some example implementations, the logging tool 102 includes an NMR tool for obtaining NMR measurements from the subterranean region 120. As shown, for example, in FIG. 1B, the logging tool 102 can be suspended in the wellbore 104 by a coiled tubing, wireline cable, or another structure that connects the tool to a surface control unit or other components of the surface equipment 112. In some example implementations, the logging tool 102 is lowered to the bottom of a region of interest and subsequently pulled upward (e.g., at a substantially constant speed) through the region of interest. As shown, for example, in FIG. 1C, the logging tool 102 can be deployed in the wellbore 104 on jointed drill pipe, hard wired drill pipe, or other deployment hardware. In some example implementations, the logging tool 102 collects data during drilling operations as it moves downward through the region of interest during drilling operations. In some example implementations, the logging tool 102 collects data while the drilling string 140 is moving, for example, while it is being tripped in or tripped out of the wellbore 104.

In some example implementations, the logging tool 102 collects data at discrete logging points in the wellbore 104. For example, the logging tool 102 can move upward or downward incrementally to each logging point at a series of depths in the wellbore 104. At each logging point, instruments in the logging tool 102 perform measurements on the subterranean region 120. The measurement data can be communicated to the computing subsystem 110 for storage, processing, and analysis. Such data may be gathered and analyzed during drilling operations (e.g., during logging while drilling (LWD) operations), during wireline logging operations, or during other types of activities.

The computing subsystem 110 can receive and analyze the measurement data from the logging tool 102 to detect properties of various subsurface layers 122. For example, the computing subsystem 110 can identify the density, material content, porosity and/or other properties of the subsurface layers 122 based on the NMR measurements acquired by the logging tool 102 in the wellbore 104.

Figure 2:
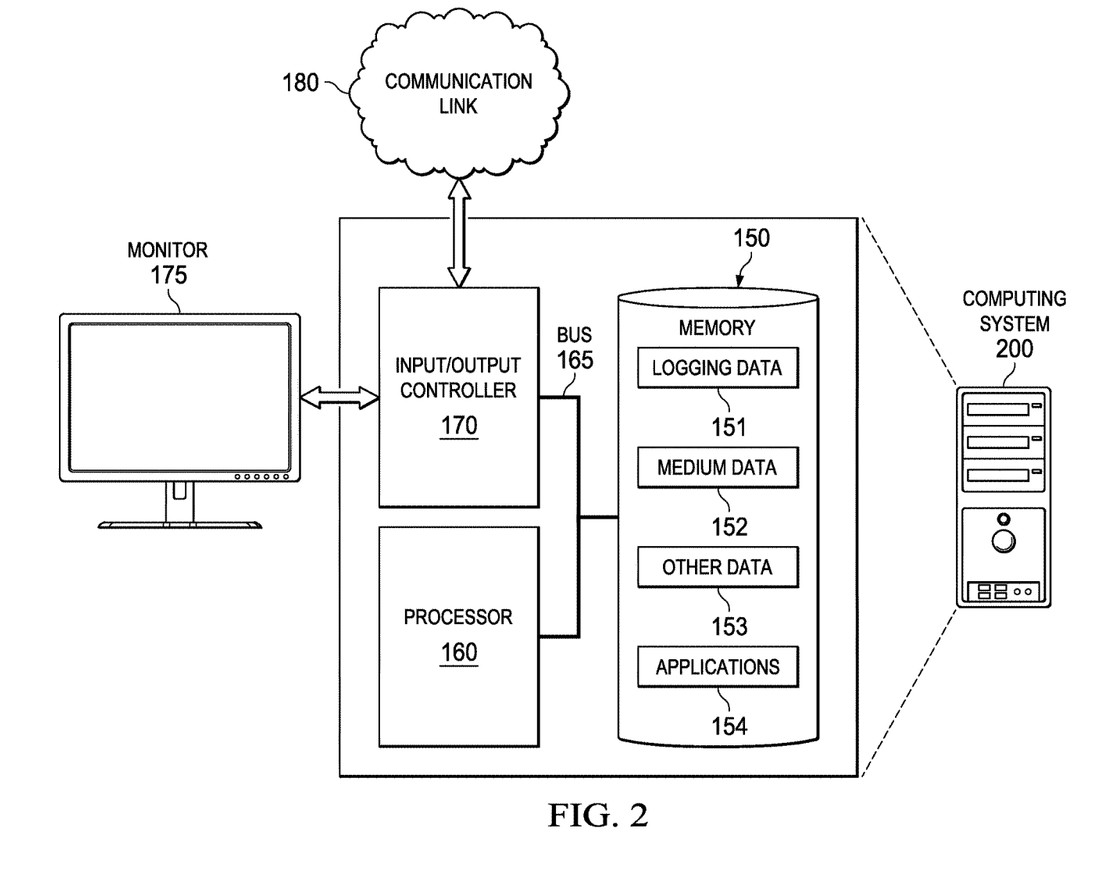
FIG. 2 is a schematic diagram of an embodiment of a computing system.

FIG. 2 is a diagram of the example computing system 200. The example computing system 200 can be used as the computing subsystem 110 of FIG. 1A, 1B, or 1C, or the example computing system 200 can be used in another manner. In some cases, the example computing system 200 can operate in connection with a well system (e.g., the well systems 100a, 100b, or 100c shown in FIG. 1A, 1B, or 1C) and be located at or near one or more wells of a well system or at a remote location. All or part of the computing system 200 may operate independent of a well system.

The example computing system 200 shown in FIG. 2 includes a memory 150, a data processing apparatus (e.g., processor) 160, and input/output controllers 170 communicably coupled by a bus 165. The memory 150 can include, for example, a random access memory (RAM), a storage device (e.g., a writable read-only memory (ROM) or others), a hard disk, or another type of storage medium. The computing subsystem 110 can be preprogrammed or it can be programmed (and reprogrammed) by loading a program from another source (e.g., from a CD-ROM, from another computer device through a data network, or in another manner).

In some examples, the input/output controller 170 is coupled to input/output devices (e.g., a monitor 175, a mouse, a keyboard, or other input/output devices) and to a communication link 180. The computing system accesses logging data when the input/output devices receive and transmit data in analog or digital form over communication links such as a serial link, a wireless link (e.g., infrared, radio frequency, or others), a parallel link, or another type of link.

The communication link 180 can include any type of communication channel, connector, data communication network, or other link. For example, the communication link 180 can include a wireless or a wired network, a Local Area Network (LAN), a Wide Area Network (WAN), a private network, a public network (such as the Internet), a WiFi network, a network that includes a satellite link, or another type of data communication network.

The memory 150 can store instructions (e.g., computer code) associated with an operating system, computer applications, and other resources. The memory 150 can also store application data and data objects that can be interpreted by one or more applications or virtual machines running on the computing system 200. As shown in FIG. 2, the example memory 150 includes logging data 151, medium data 152, other data 153, and applications 154. The data and applications in the memory 150 can be stored in any suitable form or format.

The logging data 151 can include measurements, e.g., NMR measurements, and other data from a logging tool. In some cases, the logging data 151 include one or more measurements for each of multiple different logging points in a wellbore. For example, the logging point associated with a given measurement can be the location of the logging tool's reference point when the given measurement was acquired. Each measurement can include data obtained by one or more transmitter-receiver pairs operating at one or more signal frequencies. Each measurement can include data obtained by multiple transmitter-receiver pairs operating at one or more transmitter-receiver spacings. The logging data 151 can include information identifying a transmitter-receiver spacing associate with each measurement.

The medium data 152 can include information on a medium, e.g., cement or formation. For example, the medium data 152 can include information describing the impedance, resistivity, size, depth, volume, geometry, areal extent, porosity, pressure, density, shear modulus, and other information on a medium. In some implementations, the medium data 152 includes information generated by an inversion engine. For example, the medium data 152 may include density of the medium derived from measurements and other information in the logging data 151. Accordingly, the medium data 152 may include information associated with one or more logging points.

The other data 153 can include other information that is used by, generated by, or otherwise associated with the applications 154. For example, the other data 153 can include simulated data or other information that can be used by an inversion engine to produce the medium data 152 from the logging data 151.

The applications 154 can include software applications, scripts, programs, functions, executables, or other modules that are interpreted or executed by the processor 160. For example, the applications 154 can include an inversion engine and other types of modules. The applications 154 may include machine-readable instructions for performing one or more of the operations related to FIG. 8, which is discussed in detail below.

The applications 154 can obtain input data, such as logging data, simulation data, or other types of input data, from the memory 150, from another local source, or from one or more remote sources (e.g., via the communication link 180). The applications 154 can generate output data and store the output data in the memory 150, in another local medium, or in one or more remote devices (e.g., by sending the output data via the communication link 180).

The processor 160 executes instructions, for example, to generate output data based on data inputs. For example, the processor 160 can run the applications 154 by executing or interpreting the software, scripts, programs, functions, executables, or other modules contained in the applications 154. The processor 160 may perform one or more of the operations related to FIG. 8. The input data received by the processor 160 or the output data generated by the processor 160 can include any of the logging data 151, the medium data 152, or the other data 153.

Figure 3:
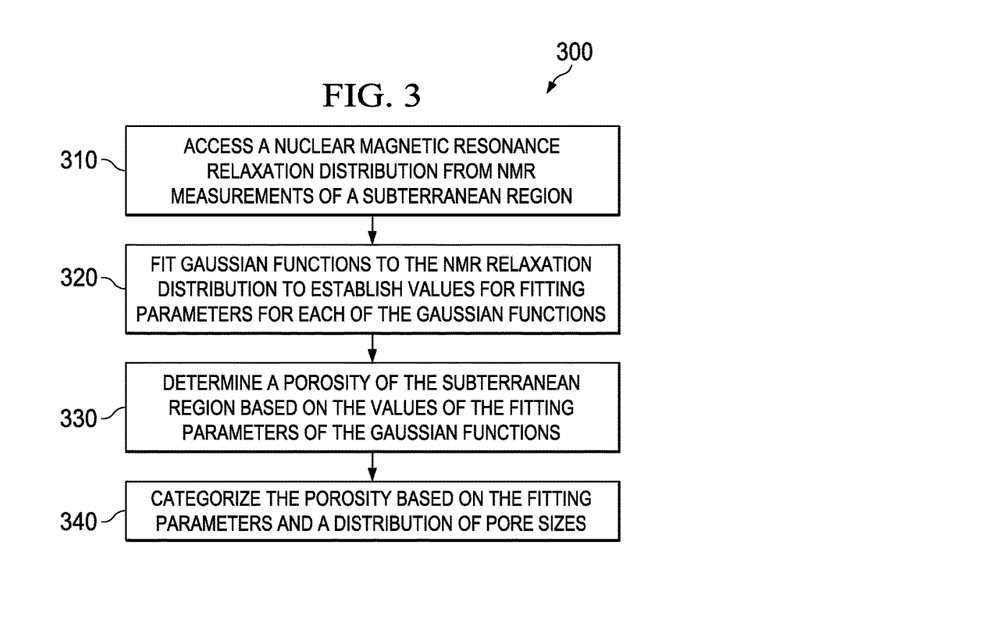
FIG. 3 is a flow chart showing an embodiment of a method for classifying a subterranean formation based on a NMR relaxation distribution.

Referring to FIG. 3, NMR relaxation distributions obtained from wireline or while drilling logs can be used to estimate porosity of subterranean regions. Steps for estimating porosity are set out in flow chart 300. First, nuclear magnetic resonance (NMR) relaxation distributions corresponding to NMR measurements of a subterranean region are accessed by a computing system (step 310).

Next, the computing system fits multiple Gaussian functions to the NMR relaxation distribution to establish values for fitting parameters for each of the Gaussian functions (step 320). The goal is to replicate the NMR relaxation distributions by combining Gaussian functions representing components of micro-, meso-, and macro-porosity pore size groups. In general, at least one Gaussian function is fit for each pore size groups. In certain embodiments, it may be advantageous to fit more than one Gaussian function to one or more of the pore size groups. For example, experience with distributions from many NMR logs suggests that in general most $T_2$ relaxation profiles observed from NMR logs can be replicated by combining five Gaussian functions (e.g., two functions for the micro pore size, two functions for the mesopore size group, and one function for the macropore size). Once the Gaussian fitting parameters are established, the computing system determines the porosity of the subterranean region based on the values of the fitting parameters (step 330). Finally, the porosity is characterized based on a relationship between the fitting parameters of the Gaussian functions and a distribution of pore sizes (step 340).

Conventional numerical algorithms can be used to perform the Gaussian fitting. For example, in certain implementations, a numerical solver such as the Stanford University NPSOL solver can be used to minimize the error between reconstructed and measured NMR relaxation distributions. This configuration may be advantageous because it not only can solve the system of non-linear relaxation response equations, but it also conveniently supports the use of inequality constraints to restrict the available solution space to acceptable and desirable regions. Halliburton's ClassiPHI porosity classification program is an example of the preferred embodiment.

Note that these methods are based on the assumption that a single phase fluid occupies the entire pore volume so that a valid link between relaxation time and pore size exists. Because most reservoirs are water-wet, the technique is not applicable to wells drilled with oil-based mud. In wells drilled with water-based mud, the relaxation data should be acquired in a manner that minimizes contributions from residual formation hydrocarbons. This can be achieved, for example, by logging after mud filtrate invasion processes have stabilized and by using NMR pulsing sequences that are designed for minimal depth of investigation.

It is instructive to consider a specific NMR relaxation distribution to further explain the algorithm shown in FIG.

Figure 4:
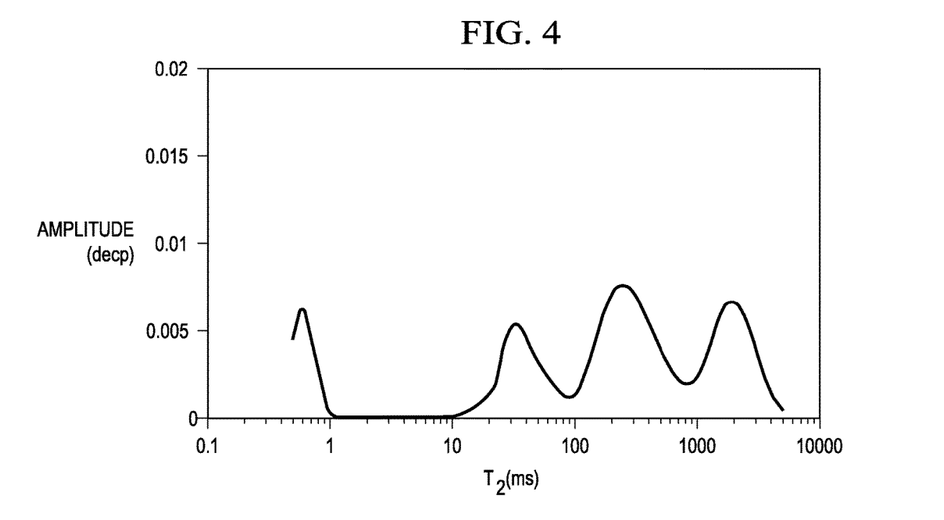
FIG. 4 is a plot of an exemplary $T_2$ NMR relaxation distribution. The horizontal axis shows relaxation time in milliseconds, with a logarithmic scale, and the vertical axis shows signal amplitude.

3. To that end, FIG. 4 shows an example $T_2$ relaxation distribution including three prominent peaks at relaxation times greater than 10 milliseconds and a fast relaxation peak at ~0.6 milliseconds. The goal of step 320 is to replicate $T_2$ relaxation distributions obtained from NMR logs by combining multiple Gaussian functions representing components of micro-, meso-, and macro-porosity pore size groups. In the present example, five Gaussian functions are assigned so that two are used to replicate log responses to micro-porosity, another two are used to replicate log responses to meso-porosity, and the remaining one is used to represent log responses to macro-porosity.

Figure 5:
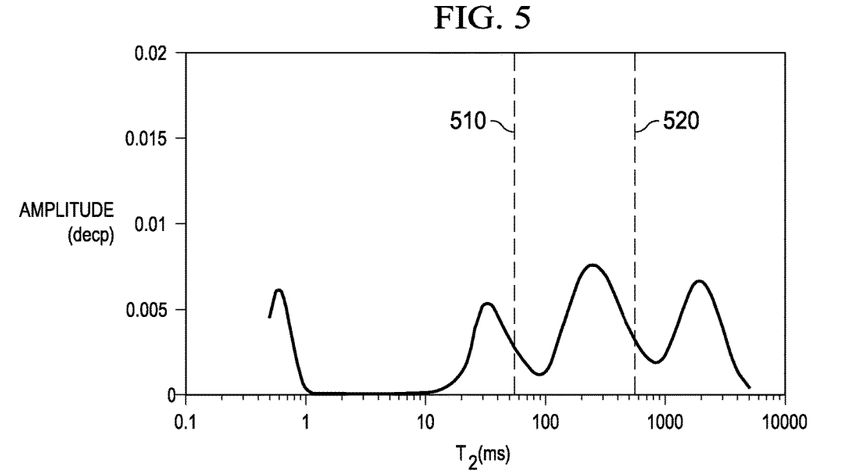
FIG. 5 shows the same plot as FIG. 4, with micro/meso and meso/macro break-over points indicated for a limestone formation.

In general, the link between $T_2$ relaxation time and pore size (radius) through the equation:

$$\frac{1}{T_2} = \rho \frac{S}{V}$$

which relates relaxation time to the formation relaxivity, $\rho$, in μm/sec, the pore surface area, $S$, and pore volume, $V$. For a spherical pore geometry, $$\frac{1}{T_2} = \rho \frac{3}{r},$$

where $r$ is the radius of the spherical pore in microns. Typical values for the $T_2$ formation relaxivity of limestone, dolomite, and sandstone formations are 3, 5, and 23 μm/sec, respectively. Thus, the x-axis of FIG. 4 can readily be rescaled in terms of a pore radius for a given formation relaxivity to the extent that pore systems in rocks can be represented by the spherical pore analog. For the purposes of using NMR relaxation distributions to categorize pore size groups, the above link between $T_2$ and pore radius provides useful break-over points between the three primary pore size groups. For example, and with reference to FIG. 5, micro/meso and meso/macro porosity break-over points corresponding to 0.5 and 5 micron pore radii in a limestone formation are represented by line 510 and line 520. Of course, these break-over points may vary for different formations, logging tool designs, or whether longitudinal ($T_2$) or transverse ($T_1$) relaxation is measured.

Figure 6:
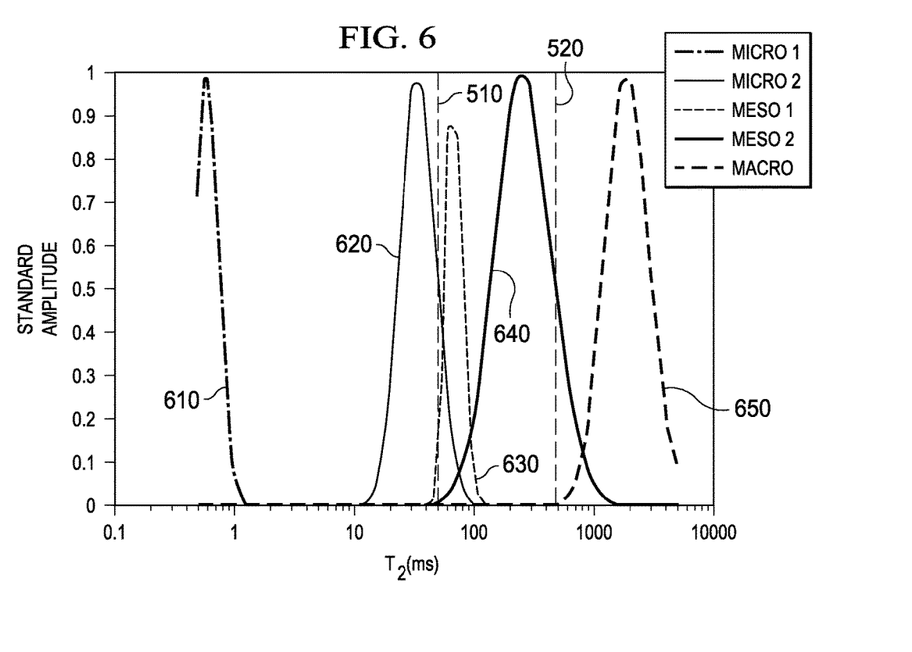
FIG. 6 shows a plot of fitted spectral shapes that reconstruct the measured distribution in FIG. 4. Two Gaussian functions are fit to the peaks corresponding to the microporous relaxation; two Gaussian functions are fit to the peaks corresponding to the meso-porous relaxation; and one Gaussian function is fit to the peak corresponding to the macro-porous relaxation.

The three primary pore size groups are obtained by solving a system of non-linear equations representing n relaxation times as follows:

$$y(T_2(1)) = a_1 e^{-0.5\left(\frac{T_2(1)-c_1}{\sigma_1}\right)^2} + a_2 e^{-0.5\left(\frac{T_2(1)-c_2}{\sigma_2}\right)^2} +$$
$$a_3 e^{-0.5\left(\frac{T_2(1)-c_3}{\sigma_3}\right)^2} + a_4 e^{-0.5\left(\frac{T_2(1)-c_4}{\sigma_4}\right)^2} + a_5 e^{-0.5\left(\frac{T_2(1)-c_5}{\sigma_5}\right)^2}$$

$$y(T_2(2)) = a_1 e^{-0.5\left(\frac{T_2(2)-c_1}{\sigma_1}\right)^2} + a_2 e^{-0.5\left(\frac{T_2(2)-c_2}{\sigma_2}\right)^2} +$$
$$a_3 e^{-0.5\left(\frac{T_2(2)-c_3}{\sigma_3}\right)^2} + a_4 e^{-0.5\left(\frac{T_2(2)-c_4}{\sigma_4}\right)^2} + a_5 e^{-0.5\left(\frac{T_2(2)-c_5}{\sigma_5}\right)^2}$$

$$y(T_2(3)) = a_1 e^{-0.5\left(\frac{T_2(3)-c_1}{\sigma_1}\right)^2} + a_2 e^{-0.5\left(\frac{T_2(3)-c_2}{\sigma_2}\right)^2} +$$
$$a_3 e^{-0.5\left(\frac{T_2(3)-c_3}{\sigma_3}\right)^2} + a_4 e^{-0.5\left(\frac{T_2(3)-c_4}{\sigma_4}\right)^2} + a_5 e^{-0.5\left(\frac{T_2(3)-c_5}{\sigma_5}\right)^2}$$

$$y(T_2(4)) = a_1 e^{-0.5\left(\frac{T_2(4)-c_1}{\sigma_1}\right)^2} + a_2 e^{-0.5\left(\frac{T_2(4)-c_2}{\sigma_2}\right)^2} +$$
$$a_3 e^{-0.5\left(\frac{T_2(4)-c_3}{\sigma_3}\right)^2} + a_4 e^{-0.5\left(\frac{T_2(4)-c_4}{\sigma_4}\right)^2} + a_5 e^{-0.5\left(\frac{T_2(4)-c_5}{\sigma_5}\right)^2}$$

$$y(T_2(5)) = a_1 e^{-0.5\left(\frac{T_2(5)-c_1}{\sigma_1}\right)^2} + a_2 e^{-0.5\left(\frac{T_2(5)-c_2}{\sigma_2}\right)^2} +$$
$$a_3 e^{-0.5\left(\frac{T_2(5)-c_3}{\sigma_3}\right)^2} + a_4 e^{-0.5\left(\frac{T_2(5)-c_4}{\sigma_4}\right)^2} + a_5 e^{-0.5\left(\frac{T_2(5)-c_5}{\sigma_5}\right)^2}$$

where $y(T_2(i))$ is the relaxation distribution amplitude for relaxation time $T_2(i)$. The parameters $a_1$, $a_2$, $a_3$, $a_4$, and $a_5$ are amplitudes for the five respective Gaussian functions. Similarly, the $c_1$, $c_2$, $c_3$, $c_4$, and $c_5$ parameters represent the locations of the relaxation times corresponding to the centers of the five Gaussian functions and the $\sigma_2$, $\sigma$, $\sigma_4$, and $\sigma_5$ parameters describe the full-width at half-maximum for each Gaussian function. The exponential terms in the above system of equations represent distribution shapes that span the domain of relaxation times (shown in FIG. 6), and when summed in proportion to their respective amplitudes, reconstruct the measured relaxation distribution from an NMR log.

The a, c, and $\sigma$ parameters for the five Gaussian functions are found by minimizing an objective function, such as:

$$\chi^2 = \sum_{i=1}^{n} (y(T_2(i)) - m(T_2(i)))^2$$

where $m(T_2(i))$ is the measured $T_2$ relaxation amplitude for relaxation time $i$. The minimum $\chi^2$ corresponds to where its derivatives with respect to the 15 unknown variables ($a_1$, $a_2$, $a_3$, $a_4$, $a_5$, $c_1$, $c_2$, $c_3$, $c_4$, $c_5$, $\sigma_1$, $\sigma_2$, $\sigma$, $\sigma_4$, and $\sigma_5$) are zero.

The solution which satisfies this condition may be found using a solver code such as NPSOL which is capable of constraining the solution variables within reasonable and desired boundary limits. For example, the solution at the minimum $\chi^2$ is constrained so and that $c_1 < c_2 \leq T_{2\_micro\_meso}$, $T_{2\_micro\_meso} + \varepsilon \leq c_3 < c_4$, $c_4 \leq T_{2\_meso\_macro}$, and $T_{2\_meso\_macro} + \varepsilon \leq c_5$, where $T_{2\_micro\_meso}$ is the break-over point between micro- and meso-sized pores and $T_{2\_meso\_macro}$ is the break-over point between meso- and macro-sized pores. The amplitude parameters, $a_i$, are constrained to a range from 0 to 1, and the full-width at half-maximum parameters, $\sigma_i$, are loosely constrained to avoid arithmetic errors.

Once the amplitude, peak position, and full-width at half-maximum parameters are calculated, the micro-, meso-, and macro-porosity values ($\phi_{micro}$, $\phi_{meso}$, $\phi_{macro}$) can be calculated. For example, the micro-, meso- and macro-porosity values may be calculated from the following summations:

$$\phi_{micro} = \sum_{i=1}^{n} a_1 e^{-0.5\left(\frac{T_2(i)-c_1}{\sigma_1}\right)^2} + a_2 e^{-0.5\left(\frac{T_2(i)-c_2}{\sigma_2}\right)^2}$$

$$\phi_{meso} = \sum_{i=1}^{n} a_3 e^{-0.5\left(\frac{T_2(i)-c_3}{\sigma_3}\right)^2} + a_4 e^{-0.5\left(\frac{T_2(i)-c_4}{\sigma_4}\right)^2}$$

$$\phi_{macro} = \sum_{i=1}^{n} a_5 e^{-0.5\left(\frac{T_2(i)-c_5}{\sigma_5}\right)^2}.$$

The result is a value for each $\phi_i$ indicative of the relative amount of micro, meso, and macro-porosity of the formation.

Further porosity classification breakdown is possible. For example, the porosity of the formation may be further classified based on a correspondence to Marzouk's rock type classification, which is described in various publications. For example, Marzouk's rock type classification is described in Marzouk, I., Takezaki, H., and Suzuki, M., "New Classification of Carbonate Rocks for Reservoir Characterization," paper SPE 49475 presented at the 1998 Abu Dhabi International Petroleum Exhibition and Conference, Abu Dhabi, U. A. E., 11-14 October; Marzouk, I., Takezaki, H., and Miwa, M., "Geologic Controls on Wettability of Carbonate Reservoirs," paper SPE 29883 presented at the 1995 Middle East Oil Show, Bahrain, 11-14 March; and Al Arfi, S., Heliot, D., Li, J., Zhan, X., and Allen, D., "A New Porosity Partitioning-Based Methodology for Permeability and Texture Analysis in Abu Dhabi Carbonates," paper SPE 101176 presented at the 2006 Abu Dhabi International Petroleum Exhibition and Conference, Abu Dhabi, U. A. E., 5-8 November. This additional classification maps the three primary pore size outputs ($\phi_{micro}$, $\phi_{meso}$, $\phi_{macro}$) into eight porosity facies based on the relative proportions of micro-, meso-, and macro-porosity. The basic scheme amounts to dividing a ternary pore size diagram into eight regions as shown in FIG. 7.

Figure 7:
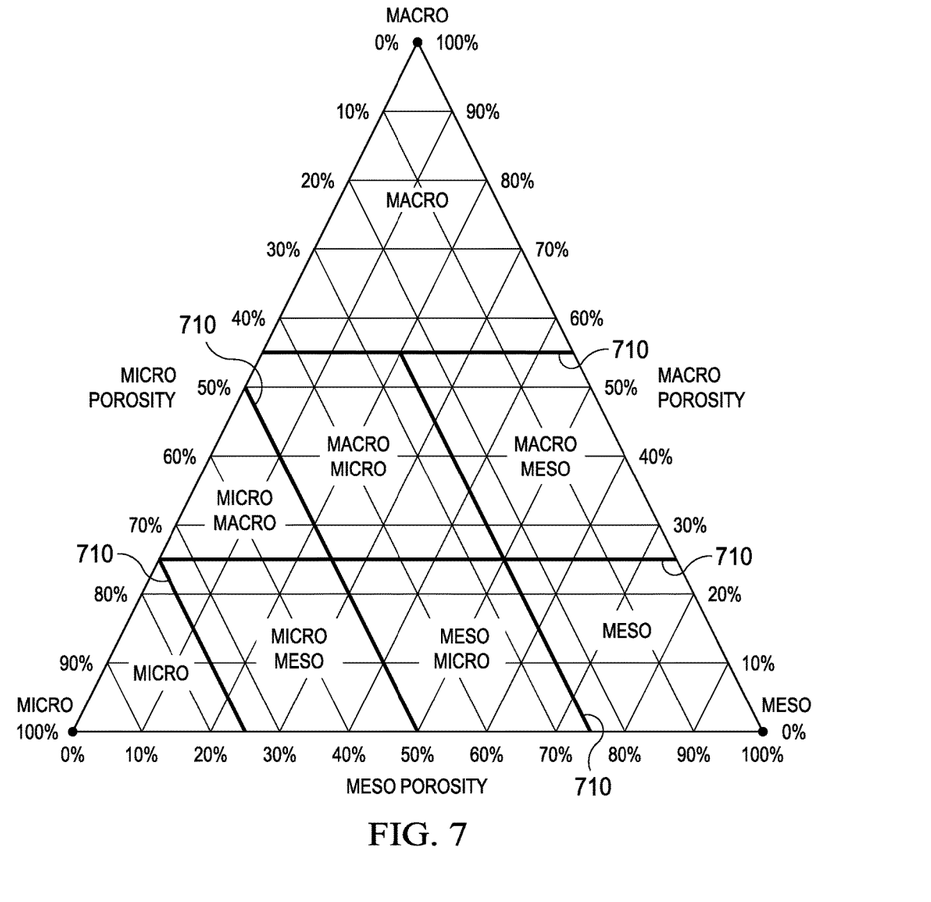
FIG. 7 is a ternary diagram for porosity facies classification.

Conventionally, one assigns a data point plotted on the ternary diagram according to its location with respect to the crisp boundary lines (710) sketched in FIG. 7. For example, the micro porosity facies would be assigned when the logical statement: If $\varphi_{macro} \leq 0.25$ and $\varphi_{micro} > 0.75$ is true, where $$\varphi_{micro} = \frac{\phi_{micro}}{\phi_{micro} + \phi_{meso} + \phi_{macro}}$$

and $$\varphi_{macro} = \frac{\phi_{macro}}{\phi_{micro} + \phi_{meso} + \phi_{macro}}.$$

Similarly, the micro-meso porosity facies would be assigned when the logical statement: If $\varphi_{macro} \leq 0.25$ and $\varphi_{micro} \geq 0.5$ and $\varphi_{micro} < 0.75$ is true.

Figure 8A:
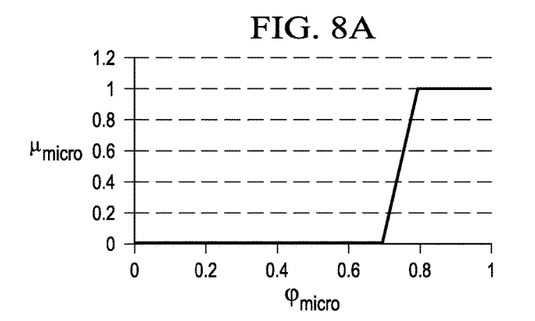
FIGS. 8A-8B are plots showing exemplary micro porosity facies membership functions.
Figure 8B:
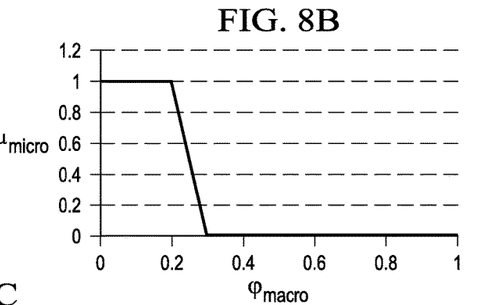
Figure 8C:
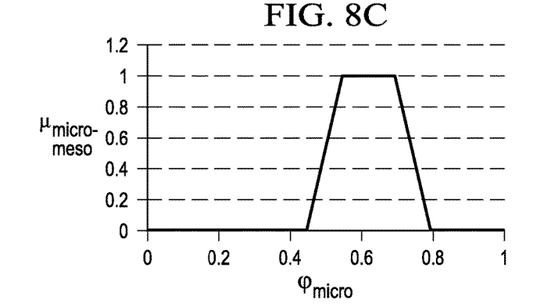
FIGS. 8C-8D are plots showing exemplary micro-meso porosity facies membership functions.
Figure 8D:
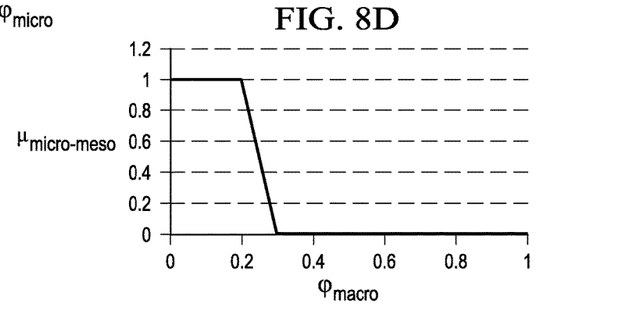

In certain implementations, the regions in ternary diagram are defined with fuzzy boundaries. For a given data point plotted on the diagram, a membership value is defined that represents the degree to which the data point belongs to each of the fuzzy regions. Following the example above, membership functions for the micro porosity facies, $\mu_{micro}$, may look like the panels shown in FIGS. 8A and 8B. Here, a value of $\phi_{micro}$ of 0.8 or more corresponds to a unique assignment to the micro porosity facies (a value of 1 on the y-axis of FIG. 8A.) However, instead of a step function transitioning from 0 to 1 at $\phi_{micro}=0.75$, $\mu_{micro}$ increases linearly for $\phi_{micro}$ from 0.7 to 0.8. In other words, the transition is via a ramp function. Similarly, FIGS. 8C and 8D shows membership functions for the micro-meso porosity facies, $\mu_{micro\_meso}$.

Membership in a fuzzy facies group is found by composing the intersection of membership values for the $\varphi_{micro}$ and $\varphi_{macro}$ variables. In fuzzy set theory, the intersection operation returns the minimum of the membership value.

To classify a data point, fuzzy membership values are evaluated for all eight porosity facies. A crisp output classification is obtained by defuzzifying the membership values as follows:

$$C = \frac{\mu_{micro} + 2\mu_{micro\_meso} + 3\mu_{micro\_macro} + 4\mu_{meso\_micro} + 5\mu_{meso} + 6\mu_{macro\_micro} + 7\mu_{macro\_meso} + 8\mu_{macro}}{\mu_{micro} + \mu_{micro\_meso} + \mu_{micro\_macro} + \mu_{meso\_micro} + \mu_{meso} + \mu_{macro\_micro} + \mu_{macro\_meso} + \mu_{macro}}$$

where C is the defuzzified output value ranging from 1 to 8. In this example, output values of 1-8 correspond to the micro, micro-meso, micro-macro, meso-micro, meso, macro-micro, macro-meso, and macro classifications, respectively. Obviously, any set of numerically discrete values corresponding to the set of porosity facies can be used to construct a defuzzification function.

Figures 9, 9A:
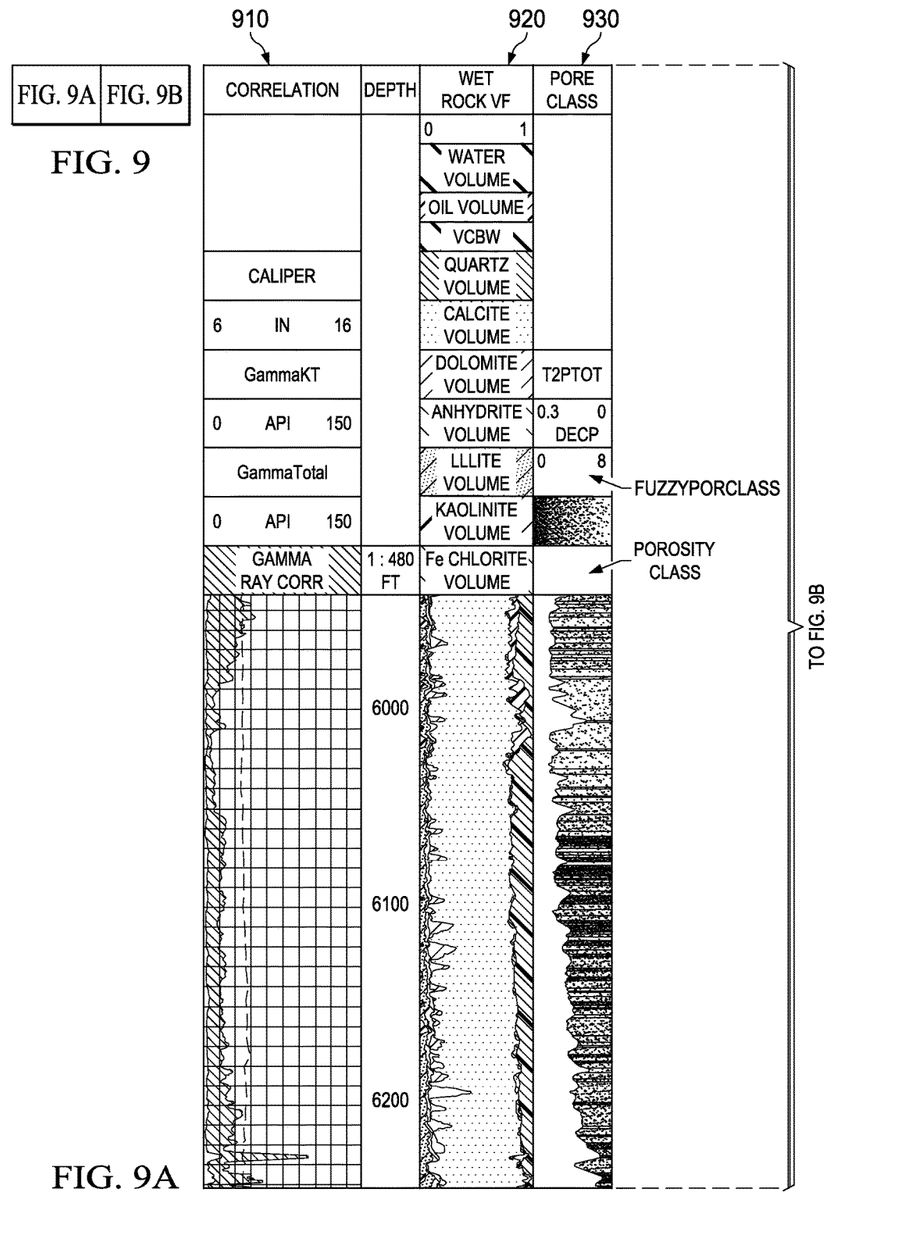
FIGS. 9A-B shows an exemplary NMR pore size classification log.
Figure 9B:
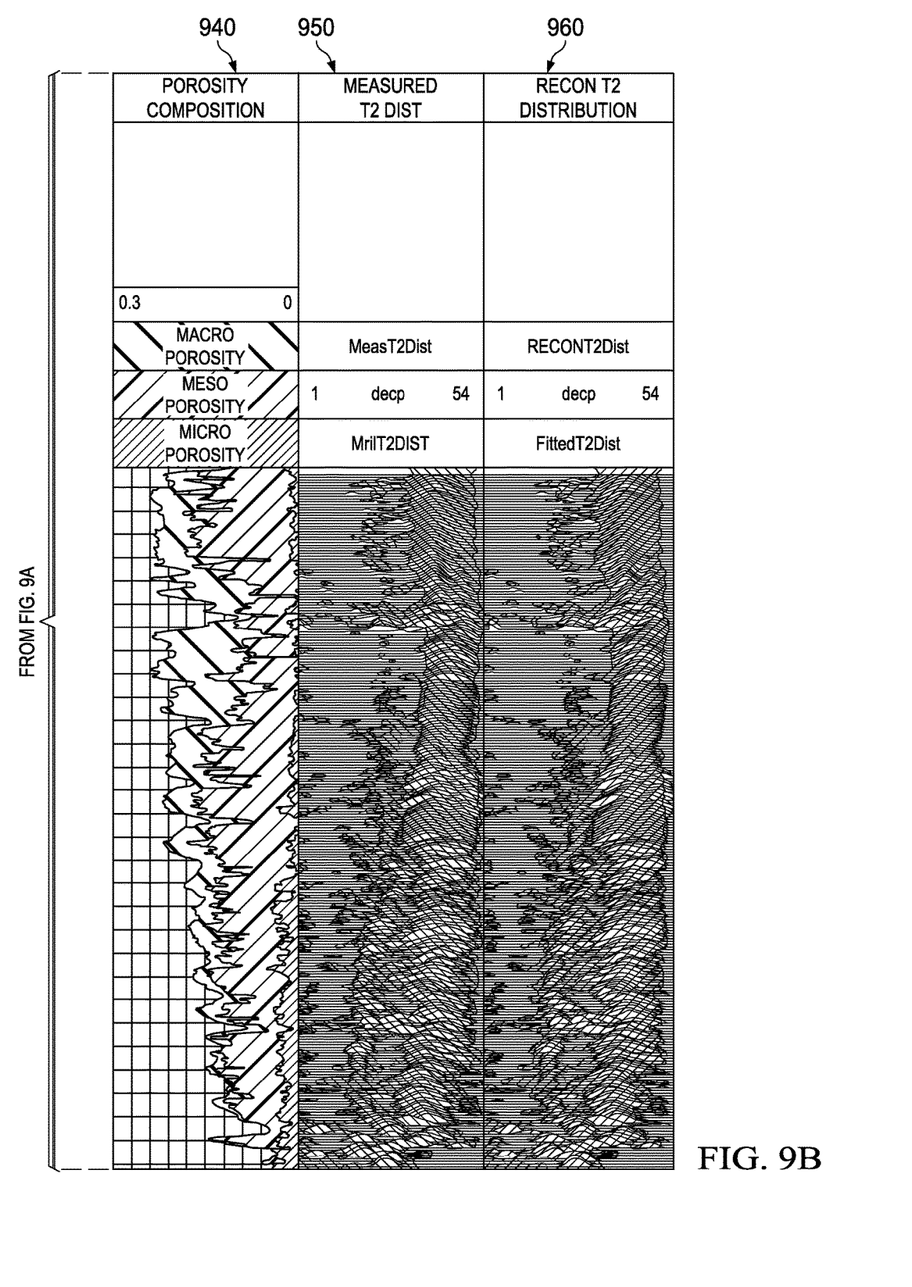

FIGS. 9A-B show exemplary results from applying the above-described methodology to an NMR log obtained in a limestone formation. Track 1 (910) shows caliper together and total gamma ray log. Also displayed in Track 1 is a gamma ray log that does not include contributions from uranium. Track 2 (920) shows a mineral and formation fluids analysis. Shown in Track 3 (930) is the porosity facies classification; shading is used to indicate the assigned porosity facies. In this example, black shading signifies micro porosity facies, white shading represents macro porosity facies, medium gray shows meso porosity facies, black/medium gray progression represents micro-meso, micro-macro, meso-micro facies, and medium gray/white progression indicates macro-micro and macro-meso facies. Track 4 (940) displays the volumes of the three primary porosity groups obtained from fitting five Gaussian functions to the measured $T_2$ relaxation distribution which is shown in Track 5 (950). The $T_2$ relaxation distribution reconstructed using the fitted Gaussian functions is shown in Track 6 (960).

Accordingly, various aspects of the invention may be summarized as follows.

In general, in an aspect, a method for estimating a porosity of a subterranean region includes accessing a nuclear magnetic resonance (NMR) relaxation distribution corresponding to NMR measurements of a subterranean region, the NMR relaxation distribution including a plurality of peaks. The method also includes using a data processing apparatus to fit a plurality of Gaussian functions to the NMR relaxation distribution to establish values for fitting parameters for each of the Gaussian functions. The method also includes determining the porosity of the subterranean region based on the values of the fitting parameters of the Gaussian functions. The method also includes categorizing the porosity based on a relationship between the fitting parameters of the Gaussian functions and a distribution of pore sizes.

Implementations of this aspect may include one or more of the following features:

The NMR relaxation distribution can be a $T_2$ distribution. The $T_2$ distribution can include a first peak corresponding to a micro-porosity pore size group, a second peak corresponding to a meso-porosity pore size group, and a third peak corresponding to a macro-porosity pore size group. At least one Gaussian function can be fit to each of the peaks. At least five Gaussian functions can be fit to the distribution. At least two Gaussian functions can be fit to the first peak. At least two Gaussian functions can be fit to the second peak. At least one Gaussian function can be fit to the third peak.

Categorizing the porosity can include selecting, based on the distribution of pore sizes, one category from the group comprising: micro, meso, and macro. The group can further include intermediate categories between the micro, meso, and macro categories.

Categorizing the porosity can include selecting a category based on membership functions that define boundaries between categories. The membership functions can include a linear combination of two or more ramp functions.

In general, in an aspect, a system includes a computing system. The computing system includes a communication interface operable to receive a nuclear magnetic resonance (NMR) relaxation distribution corresponding to NMR measurements of a subterranean region, the NMR relaxation distribution including a plurality of peaks. The computing system also includes a data processing apparatus operable to perform operations that include fitting a plurality of Gaussian functions to the NMR relaxation distribution to establish values for fitting parameters for each of the Gaussian functions, determining the porosity of the subterranean region based on the values of the fitting parameters of the Gaussian functions, and categorizing the porosity based on a relationship between the fitting parameters of the Gaussian functions and a distribution of pore sizes.

Implementations of this aspect may include one or more of the following features:

The NMR relaxation distribution can include a first peak corresponding to a micro-porosity pore size group, a second peak corresponding to a meso-porosity pore size group, and a third peak corresponding to a macro-porosity pore size group. The data processing apparatus can be operable to fit at least one Gaussian function to each of the peaks. At least five Gaussian functions can be fit to the distribution. The data processing apparatus is can be operable to fit at least two Gaussian functions to the first peak. The data processing apparatus can be operable to fit at least two Gaussian functions to the second peak. The data processing apparatus can be operable to fit at least one Gaussian function to the third peak.

The data processing apparatus can be operable to categorize the porosity by selecting, based on the distribution of pore sizes, one category from the group including: micro, meso, and macro. The group further can further include intermediate categories between the micro, meso, and macro categories.

The data processing apparatus can be operable to categorize the porosity by selecting a category based on membership functions that define boundaries between categories. The membership functions can include a linear combination of two or more ramp functions.

The NMR relaxation distribution can be a $T_2$ distribution.

In general, in another aspect, a non-transitory computer readable medium storing instructions that are operable when executed by data processing apparatus to perform operations including receiving a nuclear magnetic resonance (NMR) relaxation distribution corresponding to NMR measurements of a subterranean region, the NMR relaxation distribution including a plurality of peaks. The operations also include fitting a plurality of Gaussian functions to the NMR relaxation distribution to establish values for fitting parameters for each of the Gaussian functions. The operations also include determining the porosity of the subterranean region based on the values of the fitting parameters of the Gaussian functions. The operations also include categorizing the porosity based on a relationship between the fitting parameters of the Gaussian functions and a distribution of pore sizes.

Implementations of this aspect may include one or more of the following features:

The NMR relaxation distribution can be a $T_2$ distribution. The $T_2$ distribution can include a first peak corresponding to a micro-porosity pore size group, a second peak corresponding to a meso-porosity pore size group, and a third peak corresponding to a macro-porosity pore size group. At least one Gaussian function can be fit to each of the peaks. At least five Gaussian functions can be fit to the distribution. At least two Gaussian functions can be fit to the first peak. At least two Gaussian functions can be fit to the second peak. At least one Gaussian function can be fit to the third peak.

Categorizing the porosity can include selecting, based on the distribution of pore sizes, one category from the group including: micro, meso, and macro. The group can further include intermediate categories between the micro, meso, and macro categories.

Categorizing the porosity can include selecting a category based on membership functions that define boundaries between categories. The membership functions can include a linear combination of two or more ramp functions.

A number of embodiments have been described. Other embodiments are within the scope of the following claims.

For instance, while the above examples illustrate the use of five Gaussian functions to replicate an NMR relaxation distribution, other numbers of Gaussian functions can be used. For example, in some implementations, fewer Gaussian functions (e.g., three or forth) or a greater number of Gaussian functions (e.g., six, seven, either, nine, and so forth) can be used to replicate an NMR relaxation distribution.

Further, while the above examples illustrate the use of two Gaussian functions to replicate log responses to micro-porosity, another two to replicate log responses to meso-porosity, and one is used to represent log responses to macro-porosity, other combinations of Gaussian functions can be used to replicate the log responses to each porosity facie. For instance, in some implementations, one or more Gaussian functions (e.g., one, two, three, four, and so forth) can be used to replicate log response to each of the micro-porosity, meso-porosity, and macro-porosity facies.

In some implementations, membership functions for one of more of the porosity facies may have transitions other than ramp functions. For example, in some implementations, membership functions may have transitions defined by polynomial functions, rational functions, nth root functions, exponential functions, hyperbolic functions, logarithmic functions, other types of functions, functions defined by arbitrary lines, or combinations or two or more different functions.

What is claimed is:

1. A method for estimating a porosity of a subterranean region, the method comprising:
   accessing a nuclear magnetic resonance (NMR) relaxation distribution corresponding to NMR measurements of a subterranean region, the NMR relaxation distribution comprising a plurality of peaks;
   using a data processing apparatus to fit a plurality of Gaussian functions to the NMR relaxation distribution to establish values for fitting parameters for each of the Gaussian functions;
   determining the porosity of the subterranean region based on the values of the fitting parameters of the Gaussian functions; and
   categorizing the porosity based on a relationship between the fitting parameters of the Gaussian functions and a distribution of pore sizes.

2. The method of claim 1, wherein the NMR relaxation distribution is a $T_2$ distribution.

3. The method of claim 1, wherein the NMR distribution comprises a first peak corresponding to a micro-porosity pore size group, a second peak corresponding to a meso-porosity pore size group, and a third peak corresponding to a macro-porosity pore size group.

4. The method of claim 3, wherein at least one Gaussian function is fit to each of the peaks.

5. The method of claim 3, wherein at least two Gaussian functions are fit to the first or second peak.

6. The method of claim 1, wherein categorizing the porosity comprises selecting, based on the distribution of pore sizes, one category from the group comprising: micro, meso, and macro.

7. The method of claim 1, wherein categorizing the porosity comprises selecting a category based on membership functions that define boundaries between categories.

8. A system comprising:
a computing system comprising:
  a communication interface operable to receive a nuclear magnetic resonance (NMR) relaxation distribution corresponding to NMR measurements of a subterranean region, the NMR relaxation distribution comprising a plurality of peaks; and
  data processing apparatus operable to perform operations that include:
  fitting a plurality of Gaussian functions to the NMR relaxation distribution to establish values for fitting parameters for each of the Gaussian functions;
  determining the porosity of the subterranean region based on the values of the fitting parameters of the Gaussian functions; and
  categorizing the porosity based on a relationship between the fitting parameters of the Gaussian functions and a distribution of pore sizes.

9. The system of claim 8, wherein the NMR relaxation distribution comprises a first peak corresponding to a micro-porosity pore size group, a second peak corresponding to a meso-porosity pore size group, and a third peak corresponding to a macro-porosity pore size group.

10. The system of claim 9, wherein the data processing apparatus is operable to fit at least one Gaussian function to each of the peaks.

11. The system of claim 9, wherein the data processing apparatus is operable to fit at least two Gaussian functions to the first or second peak.

12. The system of claim 8, wherein the data processing apparatus is operable to categorize the porosity by selecting, based on the distribution of pore sizes, one category from the group comprising: micro, meso, and macro.

13. The system of claim 8, wherein the data processing apparatus is operable to categorize the porosity by selecting a category based on membership functions that define boundaries between categories.

14. The system of claim 8, wherein the NMR relaxation distribution is a $T_2$ distribution.

15. A non-transitory computer readable medium storing instructions that are operable when executed by data processing apparatus to perform operations comprising:
receiving a nuclear magnetic resonance (NMR) relaxation distribution corresponding to NMR measurements of a subterranean region, the NMR relaxation distribution comprising a plurality of peaks;
fitting a plurality of Gaussian functions to the NMR relaxation distribution to establish values for fitting parameters for each of the Gaussian functions;
determining the porosity of the subterranean region based on the values of the fitting parameters of the Gaussian functions; and
categorizing the porosity based on a relationship between the fitting parameters of the Gaussian functions and a distribution of pore sizes.

16. The non-transitory computer readable medium of claim 15, wherein the NMR relaxation distribution is a $T_2$ distribution.

17. The non-transitory computer readable medium of claim 15, wherein the NMR distribution comprises a first peak corresponding to a micro-porosity pore size group, a second peak corresponding to a meso-porosity pore size group, and a third peak corresponding to a macro-porosity pore size group.

18. The non-transitory computer readable medium of claim 17, wherein at least one Gaussian function is fit to each of the peaks.

19. The non-transitory computer readable medium of claim 17, wherein at least two Gaussian functions are fit to the first or second peak.

20. The non-transitory computer readable medium of claim 15, wherein categorizing the porosity comprises selecting, based on the distribution of pore sizes, one category from the group comprising: micro, meso, and macro.

21. The non-transitory computer readable medium of claim 15, wherein categorizing the porosity comprises selecting a category based on membership functions that define boundaries between categories.

* * * * *